(12) United States Patent
Cho et al.

(10) Patent No.: US 7,773,175 B2
(45) Date of Patent: Aug. 10, 2010

(54) DISPLAY DEVICE AND METHOD OF MANUFACTURING THE SAME

(75) Inventors: Sung-Hwan Cho, Hwaseong-si (KR); Dae-Ho Choo, Yongin-si (KR)

(73) Assignee: Samsung Electronics Co. Ltd., Suwon-Si (KR)

( * ) Notice: Subject to any disclaimer, the term of this patent is extended or adjusted under 35 U.S.C. 154(b) by 311 days.

(21) Appl. No.: 11/477,699

(22) Filed: Jun. 29, 2006

(65) Prior Publication Data
US 2007/0024774 A1    Feb. 1, 2007

(30) Foreign Application Priority Data
Jul. 29, 2005   (KR)   ............... 10-2005-0069196

(51) Int. Cl.
*G02F 1/1335*   (2006.01)
(52) U.S. Cl. ..................... 349/106; 313/505
(58) Field of Classification Search .......... 349/106–108
See application file for complete search history.

(56) References Cited

U.S. PATENT DOCUMENTS

| 5,587,819 | A | * | 12/1996 | Sunohara et al. | ............ 349/106 |
| 6,967,435 | B2 | * | 11/2005 | Park et al. | ............ 313/501 |
| 7,400,369 | B2 | * | 7/2008 | Jeong | ............ 349/114 |
| 2004/0046184 | A1 | * | 3/2004 | Yanagawa et al. | ............ 257/200 |

FOREIGN PATENT DOCUMENTS

| JP | 06175121 A | * | 6/1994 |
| JP | 2004-341527 | | 2/2004 |

* cited by examiner

*Primary Examiner*—Michelle R Connelly Cushwa
(74) *Attorney, Agent, or Firm*—F. Chau & Associates, LLC

(57) ABSTRACT

A display device includes a substrate, a first color filter pixel and a second color filter pixel. The substrate includes a first pixel region and a second pixel region adjacent to the first pixel region for displaying an image. The first color filter pixel is formed in the first pixel region to change a white light into a colored light. The first color filter pixel includes a first color layer, and a second color layer on the first color layer. The second color filter pixel is formed in the second pixel region.

23 Claims, 10 Drawing Sheets ered to the first substrate. The color filter pixel CF is on the first substrate 110. The color filter pixel CF includes pigments to generate colored lights from a white light provided from a backlight assembly (not shown).

DISPLAY DEVICE AND METHOD OF MANUFACTURING THE SAME

CROSS-REFERENCE TO RELATED APPLICATION

The present application claims priority from Korean Patent Application No. 2005-69196, filed on Jul. 29, 2005, the disclosure of which is hereby incorporated herein by reference in its entirety.

BACKGROUND OF THE INVENTION

1. Technical Field

The present disclosure relates to a display device and a method of manufacturing the display device, and more particularly, to a display device capable of simplifying a manufacturing process and a method of manufacturing the display device.

2. Discussion of the Related Art

A display device such as, for example, a liquid crystal display (LCD) device, an organic light emitting display (OLED) device may include a display panel for displaying an image and a circuit board for applying driving signals to the display panel.

The LCD device displays the image using a liquid crystal layer and a color filter pixel. The LCD device includes an electrode to control the liquid crystal layer and a thin film transistor (TFT) for applying a driving voltage to the electrode.

The color filter pixel of the LCD device includes a colorant or a pigment to change a white light into a color light.

When the color filter pixel includes the colorant, a manufacturing process of the color filter pixel is complex, and a color reproducibility of the color filter pixel is changed based on a thickness of the color filter pixel.

When the color filter pixel includes the pigment, the manufacturing process of the color filter pixel is simplified, and the color reproducibility of the color filter pixel is better than the color filter pixel having the colorant. However, a deposition rate of a green colorant for a green color filter portion is greater than that of a blue colorant for a blue color filter portion or a red colorant for a red color filter portion, thereby increasing a manufacturing time of the LCD device.

SUMMARY OF THE INVENTION

Embodiments of the present invention provide a display device capable of simplifying a manufacturing process, and a method of manufacturing the above-mentioned display device.

A display device in accordance with an embodiment of the present invention includes a substrate, a first color filter pixel and a second color filter pixel. The substrate includes a first pixel region and a second pixel region adjacent to the first pixel region for displaying an image. The first color filter pixel is formed in the first pixel region to change a white light into a colored light. The first color filter pixel includes a first color layer in the first pixel region, and a second color layer on the first color layer. The second color filter pixel is formed in the second pixel region.

A display device in accordance with an embodiment of the present invention includes a substrate, a first color filter pixel, a second color filter pixel and a third color filter pixel. The substrate includes a first pixel region, a second pixel region and a third pixel region for displaying an image. The first color filter pixel is in the first pixel region. The first color filter pixel includes a blue pigment for generating a blue light and a yellow pigment for generating a yellow light so that the blue and yellow lights are mixed to generate a green light. The second color filter pixel is in the second pixel region. The second color filter pixel includes a red pigment for generating a red light. The third color filter pixel is in the third pixel region. The third color filter pixel includes a blue pigment for generating a blue light.

A method of manufacturing a display device in accordance with an embodiment of the present invention is provided as follows. A first pixel region, a second pixel region and a third pixel region are defined on a substrate for displaying an image. A first color filter pixel that includes a first color layer having a first pigment and a second color layer having a second pigment is formed on the substrate. The first color layer is in the first pixel region, and the second color layer is on the first color layer. A second color filter pixel including a third pigment is formed in the second pixel region. A third color filter pixel including the first or the second pigment is formed in the third pixel region.

The display device may further include an opposite substrate corresponding to the substrate having the color filter pixel, and a liquid crystal layer interposed between the substrates. Alternatively, the display device may further include an organic light emitting layer.

According to the embodiments of the present invention, one of the color filter pixels includes a plurality of pigments to decrease a time period for manufacturing the display device. In addition, an image display quality of the display device having the color filter pixel is improved.

BRIEF DESCRIPTION OF THE DRAWINGS

Exemplary embodiments of the present invention can be understood in more detail from the following descriptions taken in conjunction with the accompanying drawings, in which.

DESCRIPTION OF THE EMBODIMENTS

Exemplary embodiments of the present invention will now be described more fully hereinafter below in more detail with reference to the accompanying drawings. This invention may, however, be embodied in many different forms and should not be construed as limited to the embodiments set forth herein.

Hereinafter, embodiments of the present invention will be described in detail with reference to the accompanying drawings.

Figure 1:
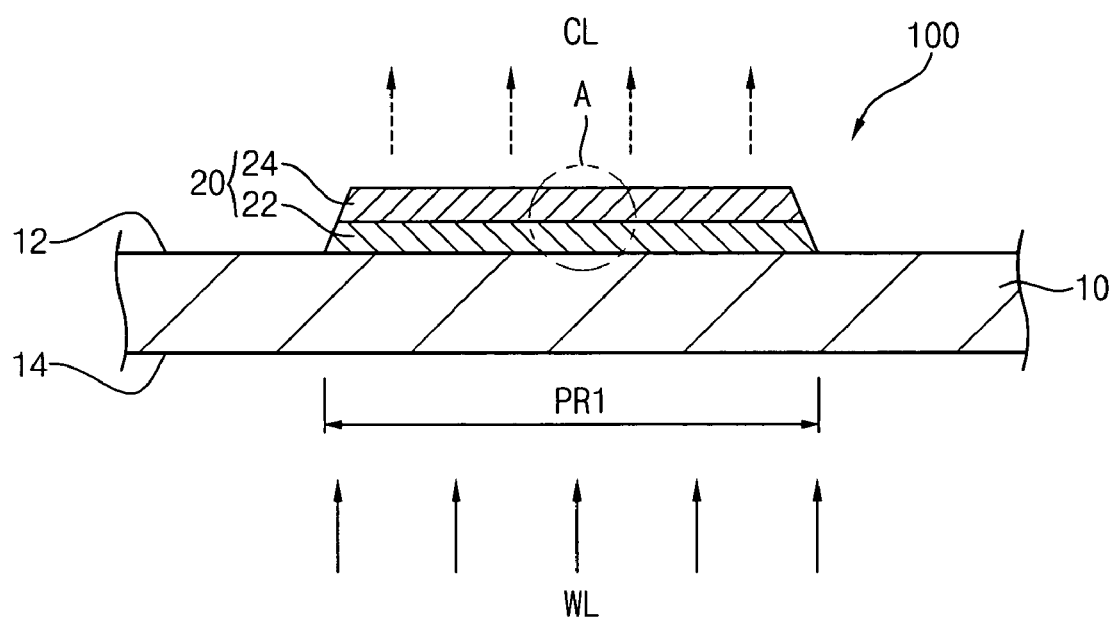
FIG. 1 is a cross-sectional view showing a display device in accordance with an embodiment of the present invention.

FIG. 1 is a cross-sectional view showing a display device in accordance with an embodiment of the present invention.

Referring to FIG. 1, the display device 100 includes a substrate 10 and a first color filter pixel 20.

For example, the substrate 10 includes a transparent glass substrate. The substrate 10 may have a substantially rectangular shape having a predetermined thickness. The substrate 10 includes an upper surface 12, a lower surface 14 corresponding to the upper surface 12 and a side surface (not shown) connected between the upper and lower surfaces 12 and 14.

The substrate 10 includes a first pixel region PR1. For example, a plurality of pixel regions PR1 is arranged on the substrate 10 in a matrix shape.

In FIG. 1, a white light WL is irradiated on the lower surface 14 of the substrate 10, and the white light WL that has passed through the substrate 10 exits from the upper surface 12 of the substrate 10.

Figure 2A:
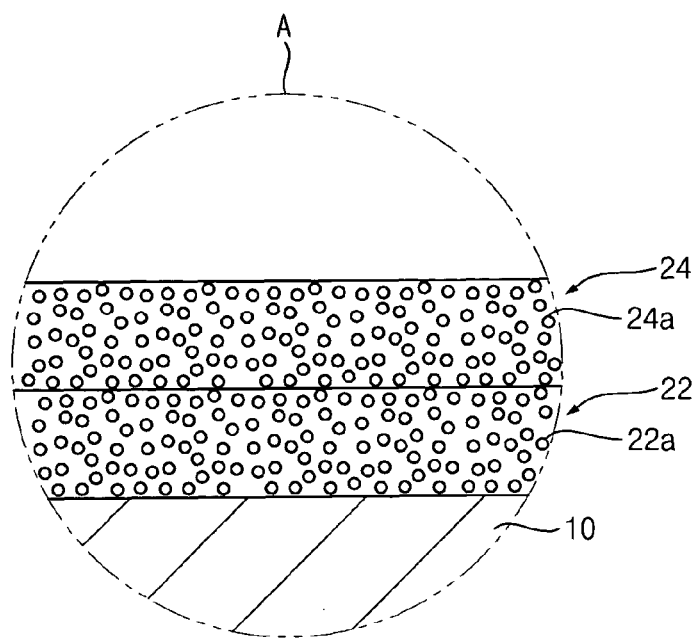
FIG. 2A is an enlarged cross-sectional view showing a portion 'A' shown in FIG. 1.

FIG. 2A is an enlarged cross-sectional view showing a portion 'A' shown in FIG. 1.

Referring to FIGS. 1 and 2A, a first color filter pixel 20 is on the upper surface 12 of the substrate 10. The first color filter pixel 20 may be in the first pixel region PR1, the first pixel region having a substantially quadrangular or rectangular shape when viewed on a plane.

The first color filter pixel 20 transmits a colored light CL so that the white light WL is changed into the colored light CL. For example, the colored light CL is a green light.

In order to change the white light WL into the colored light CL using the first color filter pixel 20, the first color filter pixel 20 includes a first color layer 22 and a second color layer 24.

For example, the first color layer 22 is on the upper surface 12 of the substrate 10 corresponding to the first pixel region PR1. The first color layer 22 may include a yellow color layer that transmits a yellow light so that the white light WL is changed into the yellow light. In FIGS. 1 and 2A, the first color layer 22 may include a yellow pigment 22a. For example, the yellow pigment 22a may include iron oxide yellow, and/or titan yellow. Alternatively, the yellow pigment 22a may include various pigment compounds.

The second color layer 24 is on the first color layer 22. The second color layer 24 corresponds to the entire first color layer 22. That is, the second color layer 24 may have a substantially same size as the first color layer 22. The second color layer 24 may include a blue color layer that transmits a blue light so that the white light WL is changed into the blue light. The second color layer 24 may include a blue pigment 24a. For example, the blue pigment 24a may include prussian blue, and/or cobalt blue. Alternatively, the blue pigment 24a may include various pigment compounds.

The yellow light that has passed through the first color layer 22 is incident onto the second color layer 24 so that the yellow light is changed into the green light.

The first color layer 22 has a first thickness, and the second color layer 24 has a second thickness. The second thickness may be about one to about five times the first thickness. For example, the second thickness of the second color layer 24 may be about 50 nm to about 600 nm.

Figure 2B:
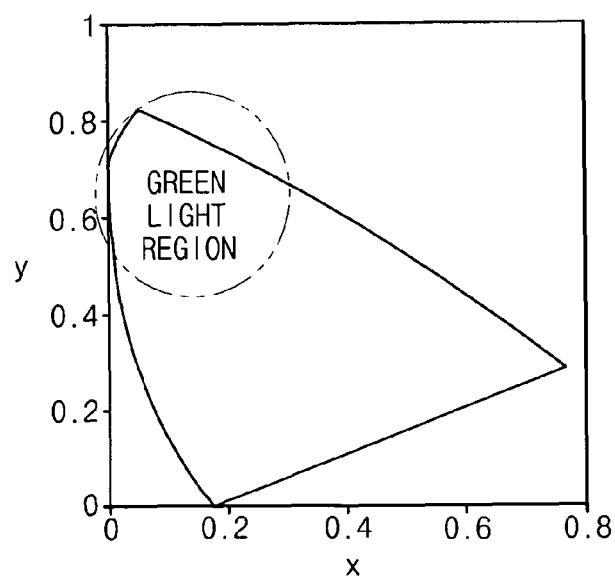
FIG. 2B is a graph showing a color coordinates of a green light that has passed through a first color filter pixel shown in FIG. 1.

FIG. 2B is a graph showing color coordinates of a green light that has passed through a first color filter pixel shown in FIG. 1.

Referring to FIGS. 1 and 2B, when the first thickness of the first color layer 22 and the second thickness of the second color layer 24 are about 500 nm and about 2,500 nm, respectively, a light transmittance of the first color filter pixel 20 is about 51.7%. In addition, a mean value of the X coordinate of the green light that has passed through the first color layer 22 is about 0.163, and a mean value of the Y coordinate of the green light that has passed through the first color layer 22 is about 0.254, thereby displaying the green light in a green light region.

When the first thickness of the first color layer 22 and the second thickness of the second color layer 24 are about 2,500 nm and about 2,500 nm, respectively, the light transmittance of the first color filter pixel 20 is about 46.3%. In addition, the mean value of the X coordinate of the green light that has passed through the first color layer 22 is about 0.168, and the mean value of the Y coordinate of the green light that has passed through the first color layer 22 is about 0.425, thereby also displaying the green light in the green light region.

When the first thickness of the first color layer 22 and the second thickness of the second color layer 24 are about 5,000 nm and about 5,000 nm, respectively, the light transmittance of the first color filter pixel 20 is about 15.8%. In addition, the mean value of the X coordinate of the green light that has passed through the first color layer 22 is about 0.088, and the mean value of the Y coordinate of the green light that has passed through the first color layer 22 is about 0.537, thereby displaying the green light in the green light region.

When the first thickness of the first color layer 22 and the second thickness of the second color layer 24 are about 6,000 nm and about 6,000 nm, respectively, the light transmittance of the first color filter pixel 20 is about 9.8%. In addition, the mean value of the X coordinate of the green light that has passed through the first color layer 22 is about 0.074, and the mean value of the Y coordinate of the green light that has passed through the first color layer 22 is about 0.533, thereby displaying the green light in the green light region.

Figure 3:
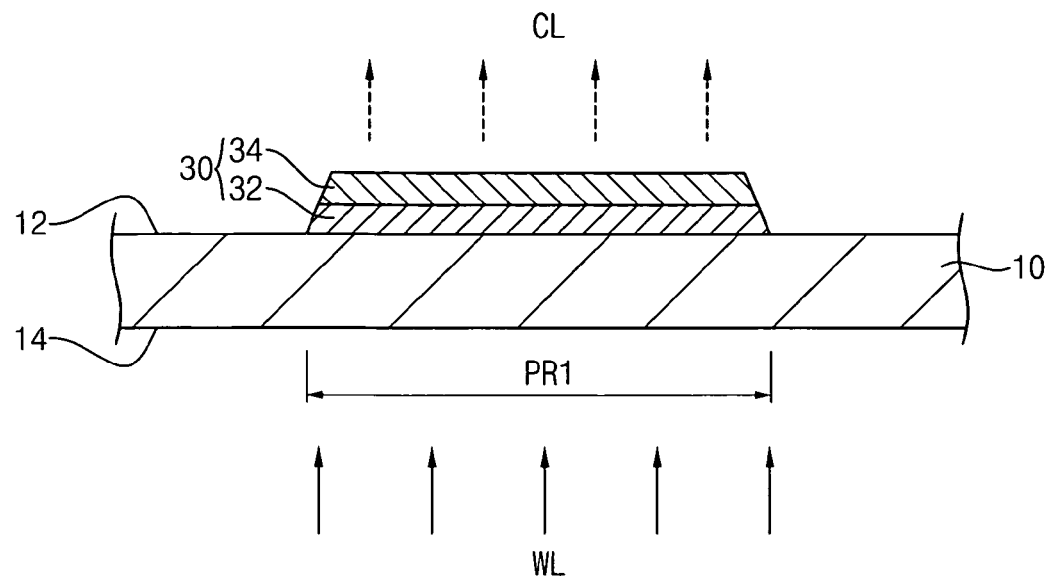
FIG. 3 is a cross-sectional view showing a display device in accordance with an embodiment of the present invention.

FIG. 3 is a cross-sectional view showing a display device in accordance with an embodiment of the present invention. The display device of FIG. 3 is substantially the same as in FIGS. 1 and 2A except with respect to, for example, a first color filter pixel. Referring to FIG. 3, the first color filter pixel 30 includes a first color layer 32 and a second color layer 34.

For example, the first color layer 32 is on an upper surface 12 of a substrate 10 corresponding to a first pixel region PR1. The first color layer 32 may include a blue color layer that transmits a blue light so that a white light WL is changed into the blue light. In FIG. 3, the first color layer 32 may include, for example, a blue pigment or a blue colorant.

The second color layer 34 is on the first color layer 32. The second color layer 34 corresponds to the entire first color layer 32. That is, the second color layer 34 may have a substantially same size as the first color layer 32. For example, the second color layer 34 may include a yellow color layer that transmits a yellow light so that the white light WL is changed into the yellow light. The second color layer 34 may include, for example, a yellow pigment or a yellow colorant. Alternatively, the first color layer 32 may include the yellow pigment or the yellow colorant, and the second color layer 34 may include the blue pigment or the blue colorant.

The blue light that has passed through the first color layer 32 is incident onto the second color layer 34 so that the blue light is changed into a green light.

The first color layer 32 has a first thickness, and the second color layer 34 has a second thickness. The second thickness may be about one to about five times the first thickness. In particular, the first thickness of the first color layer 32 may be about 50 nm to about 600 nm.

Figure 4:
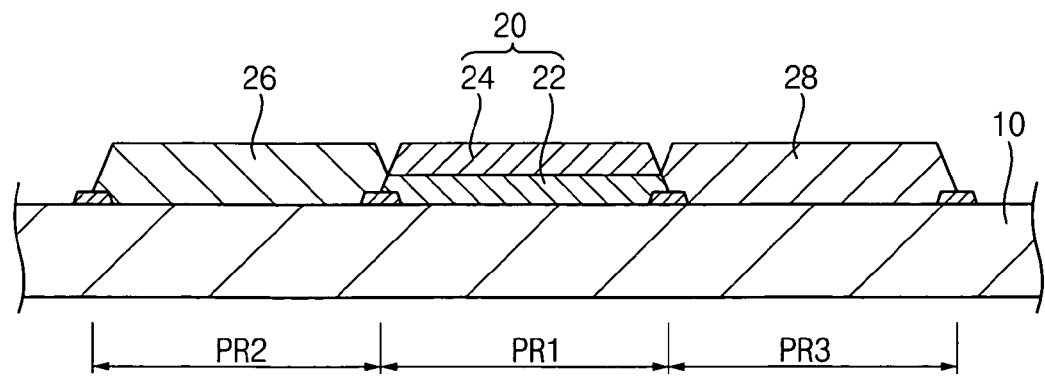
FIG. 4 is a cross-sectional view showing a display device in accordance with an embodiment of the present invention.

FIG. 4 is a cross-sectional view showing a display device in accordance with an embodiment of the present invention. The display device of FIG. 4 is substantially the same as in FIGS. 1 and 2A, except with respect to, for example, a second color filter pixel and a third color filter pixel.

Referring to FIG. 4, a substrate 10 includes a first pixel region PR1, a second pixel region PR2 and a third pixel region PR3. Each of the first, second and third pixel regions PR1, PR2 and PR3 has a substantially quadrangular or rectangular shape when viewed on a plane.

A first color filter pixel 20 is formed in the first pixel region PR1. The first color filter pixel 20 includes a first color layer 22 and a second color layer 24 on the first color layer 22. The first and second color layers 22 and 24 may include a yellow pigment for generating a yellow light and a blue pigment for generating a blue light, respectively.

The second pixel region PR2 is adjacent to the first pixel region PR1, and a second color filter pixel 26 is formed in the second pixel region PR2. The second color filter pixel 26 may include a red pigment for generating a red light.

The third pixel region PR3 is adjacent to the first pixel region PR1, and a third color filter pixel 28 is formed in the third pixel region PR3. The third color filter pixel 28 may include a blue pigment for generating a blue light.

Figure 5:
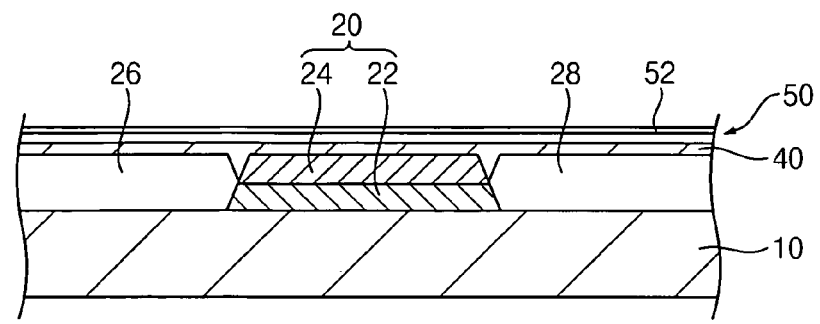
FIG. 5 is a cross-sectional view showing a display device in accordance with an embodiment of the present invention.

FIG. 5 is a cross-sectional view showing a display device in accordance with an embodiment of the present invention. The display device of FIG. 5 is substantially the same as the display device shown in FIG. 4 except, with respect to, for example, a transparent electrode and an alignment layer.

Referring to FIG. 5, a transparent electrode 40 is on a first color filter pixel 20 for generating a green light, a second color filter pixel 26 for generating a red light and a third color filter pixel 28 for generating a blue light. For example, the transparent electrode 40 may be formed on the entire upper surface 12 of a substrate 10 to cover the first, second and third color filter pixels 20, 26 and 28.

The transparent electrode 40 may include a transparent conductive material. Examples of the transparent conductive material that can be used for the transparent electrode 40 include indium tin oxide (ITO), indium zinc oxide (IZO), and/or amorphous indium tin oxide.

The alignment layer 50 may be formed on the transparent electrode 40. The alignment layer 50 may include an alignment groove 52 for aligning liquid crystals.

Figure 6:
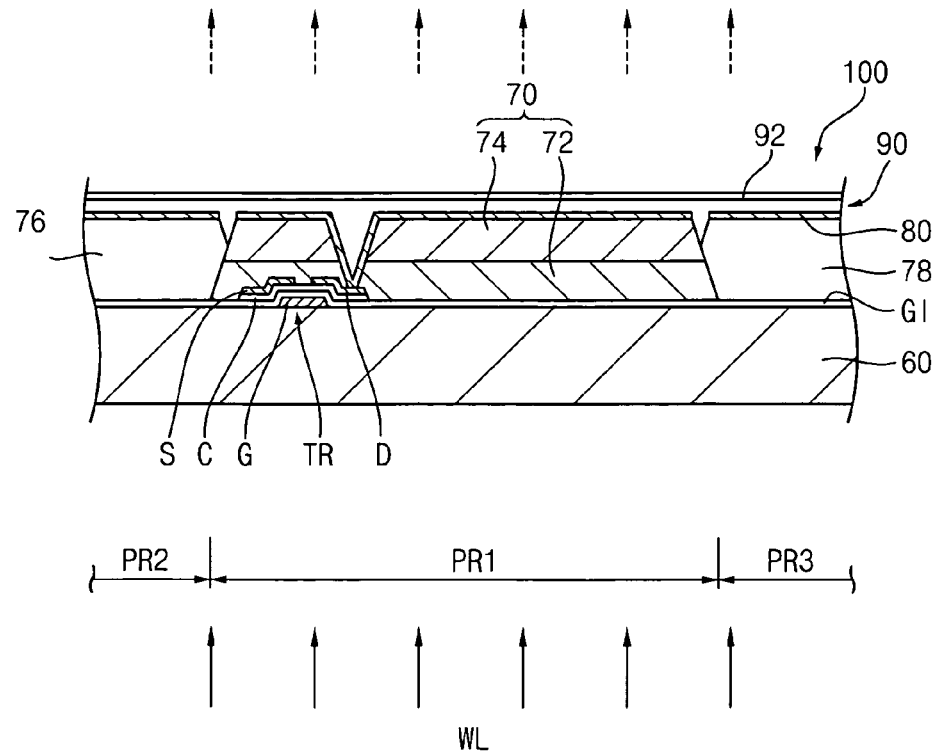
FIG. 6 is a cross-sectional view showing a display device in accordance with an embodiment of the present invention.

FIG. 6 is a cross-sectional view showing a display device in accordance with an embodiment of the present invention.

Referring to FIG. 6, the display device 100 includes a substrate 60, a thin film transistor TR, a first color filter pixel 70, a second color filter pixel 76, a third color filter pixel 78, a transparent electrode 80 and an alignment layer 90.

The substrate 60 includes a first pixel region PR1, a second pixel region PR2 and a third pixel region PR3. Each of the first, second and third pixel regions PR1, PR2 and PR3 has a substantially quadrangular or rectangular shape when viewed on a plane.

The thin film transistor TR is formed in each of the first, second and third pixel regions PR1, PR2 and PR3.

The thin film transistor TR includes a gate electrode G, a gate insulating layer GI, a channel layer C, a source electrode S and a drain electrode D.

The gate electrode is formed in each of the first, second and third pixel regions PR1, PR2 and PR3. A gate line (not shown) is electrically connected to the gate electrode G. A timing signal that has a greater level than a threshold voltage for forming a channel in the channel layer C is applied to the gate electrode G through the gate line (not shown).

The gate insulating layer GI is formed on the substrate 60 having the gate electrode G and the gate line (not shown) to cover the gate electrode G and the gate line (not shown).

The channel layer C is formed on the gate insulating layer GI corresponding to the gate electrode G. The channel layer C includes, for example, an amorphous silicon pattern, a first high-density impurity implanted amorphous silicon pattern and a second high-density impurity implanted amorphous silicon pattern. The first and second high-density impurity implanted amorphous silicon patterns are on the amorphous silicon pattern, and are spaced apart from each other.

The source electrode S is formed in each of the first, second and third pixel regions PR1, PR2 and PR3. The source electrode S is electrically connected to a data line (not shown). A data driving voltage for displaying an image is applied to the source electrode S through the data line (not shown).

The drain electrode D is electrically connected to the channel layer C. The drain electrode D is spaced apart from the source electrode S.

The first color filter pixel 70 is in the first pixel region PR1 of the substrate 70. The first color filter pixel 70 includes a first color layer 72 and a second color layer 74. The first color layer 72 is on the substrate 70, and the second color layer 74 is on the first color layer 72.

When a white light WL is incident into the first color filter pixel 70, the first color filter pixel 70 transmits a colored light CL such as a green light.

For example, the first color layer 72 may include a yellow pigment so that the first color layer 72 changes the white light WL into a yellow light, and the second color layer 74 may include a blue pigment so that the second color layer 74 changes the white light WL into a blue light. In addition, when the yellow light is incident into the second color layer 74, the second color layer 74 changes the yellow light into the green light. That is, when the white light WL is incident onto the first color filter pixel 70, the white light WL is changed into the yellow light by the first color layer 72, and the yellow light is changed into the green light by the second color layer 74. Alternatively, the first color layer 72 may include the blue pigment so that the first color layer 72 changes the white light WL into the blue light, and the second color layer 74 may include the yellow pigment so that the second color layer 74 changes the white light WL into the yellow light.

The second color filter pixel 76 is in the second pixel region PR2 of the substrate 60. The second pixel region PR2 is adjacent to the first pixel region PR1. For example, the second color filter pixel 76 includes a red pigment to change the white light WL into a red light.

The third color filter pixel 78 is in the third pixel region PR3 of the substrate 60. The third pixel region PR3 is adjacent to the first pixel region PR1. For example, the third color filter pixel 78 includes the blue pigment to change the white light WL into the blue light.

The transparent electrode 80 is on the first color filter pixel 70 that is in the first pixel region PR1, the second color filter pixel 76 that is in the second pixel region PR2 and the third color filter pixel 78 that is in the third pixel region PR3. The transparent electrode 80 includes a transparent conductive material. Examples of the transparent conductive material that can be used for the transparent electrode 80 include indium tin oxide (ITO), indium zinc oxide (IZO), and/or amorphous indium tin oxide.

A contact hole through which the drain electrode D is exposed is formed in each of the first, second and third color filter pixels 70, 76 and 78. The transparent electrode 80 that is on each of the first, second and third color filter pixels 70, 76 and 78 is electrically connected to the drain electrode D of the thin film transistor TR.

The alignment layer 90 is on the substrate 60 to cover the transparent electrode 80. The alignment layer 90 includes alignment grooves 92 to align liquid crystals.

Figure 7:
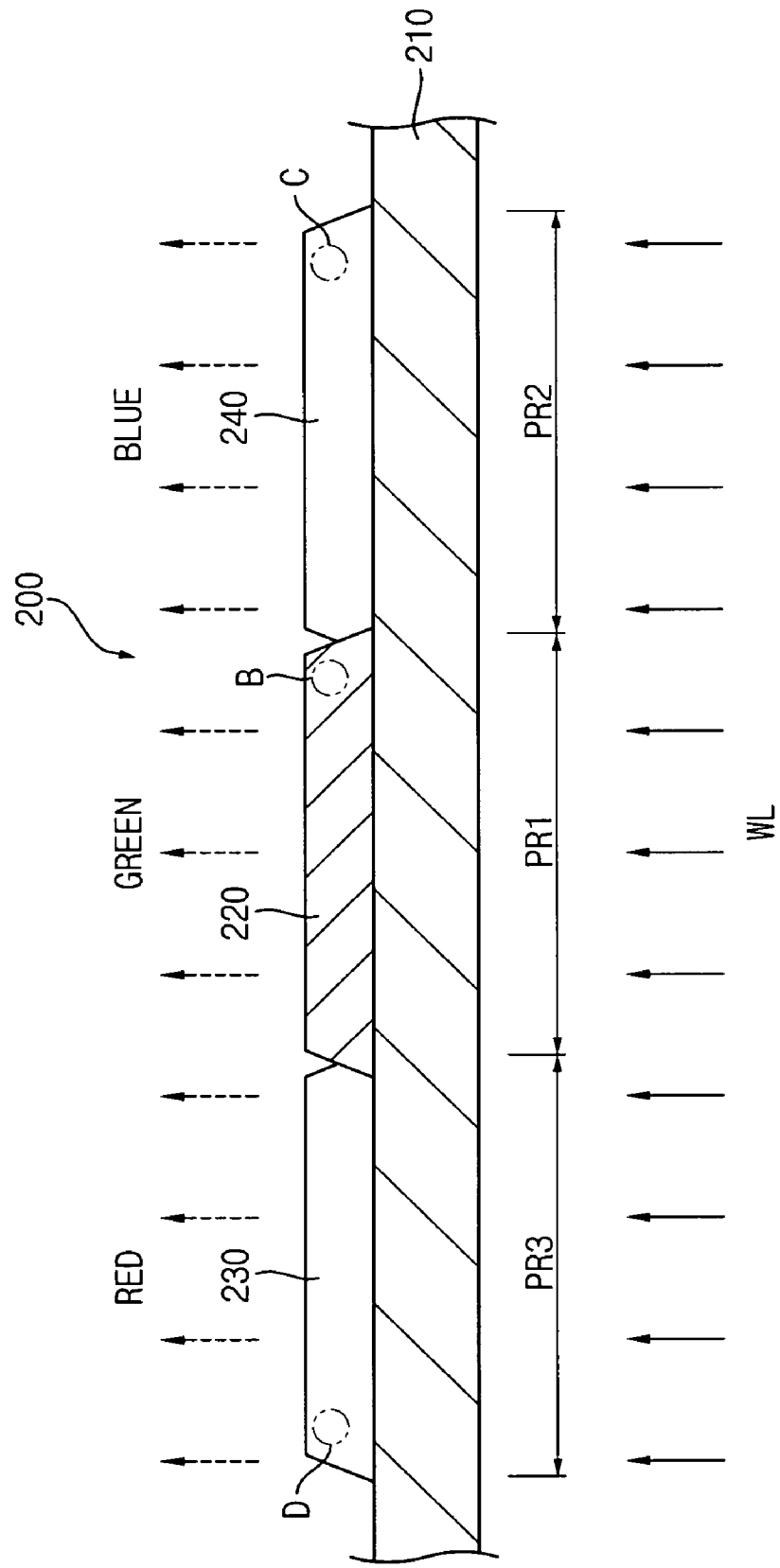
FIG. 7 is a cross-sectional view showing a display device in accordance with an embodiment of the present invention.
Figure 8:
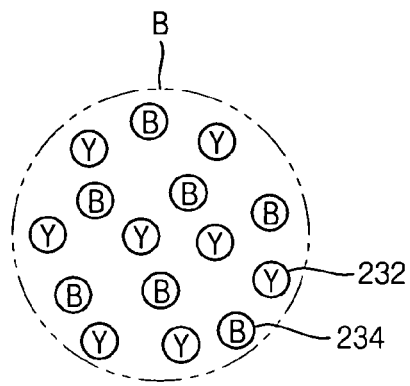
FIG. 8 is an enlarged cross-sectional view showing a portion 'B' shown in FIG. 7.
Figure 9:
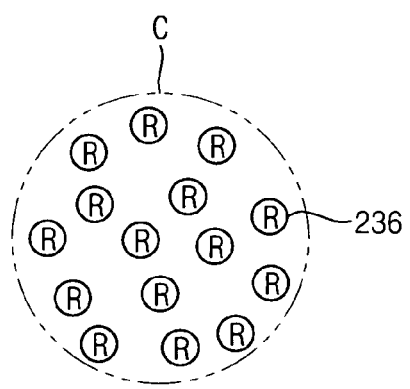
FIG. 9 is an enlarged cross-sectional view showing a portion 'C' shown in FIG. 7.
Figure 10:
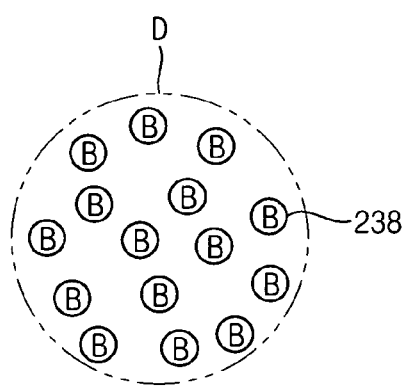
FIG. 10 is an enlarged cross-sectional view showing a portion 'D' shown in FIG. 7.

FIG. 7 is a cross-sectional view showing a display device in accordance with an embodiment of the present invention. FIG. 8 is an enlarged cross-sectional view showing a portion 'B' shown in FIG. 7. FIG. 9 is an enlarged cross-sectional view showing a portion 'C' shown in FIG. 7. FIG. 10 is an enlarged cross-sectional view showing a portion 'D' shown in FIG. 7.

Referring to FIG. 7, the display device 200 includes a substrate 210, a first color filter pixel 220, a second color filter pixel 230 and a third color filter pixel 240.

The substrate 210 may include a transparent glass substrate. The substrate 210 includes a first pixel region PR1, a second pixel region PR2 and a third pixel region PR3. Each of the first, second and third pixel regions PR1, PR2 and PR3 has a substantially quadrangular or rectangular shape when viewed on a plane.

Referring to FIG. 8, the first color filter pixel 220 is in the first pixel region PR1. For example, the first color filter pixel 220 includes a yellow pigment 232 for generating a yellow light and a blue pigment 234 for generating a blue light. The yellow and blue pigments 232 and 234 can be uniformly distributed in the first color filter pixel 220. A volumetric ratio of the blue to yellow pigments in the first color filter pixel can be about 1:1 to about 1:5.

The yellow light generated from the yellow pigment 232 and the blue light generated from the blue pigment 234 are mixed to generate a green light so that a white light WL that is irradiated into the first color filter pixel 220 is changed into the green light.

Referring to FIG. 9, the second color filter pixel 230 is in the second pixel region PR2 that is adjacent to the first pixel region PR1. For example, the second color filter pixel 230 includes a red pigment 236 for generating a red light.

The third pixel region PR3 is adjacent to the first pixel region PR1, and the third color filter pixel 240 is in the third pixel region PR3. For example, the third color filter pixel 240 includes a blue pigment 238 for generating a blue light.

Figure 11:
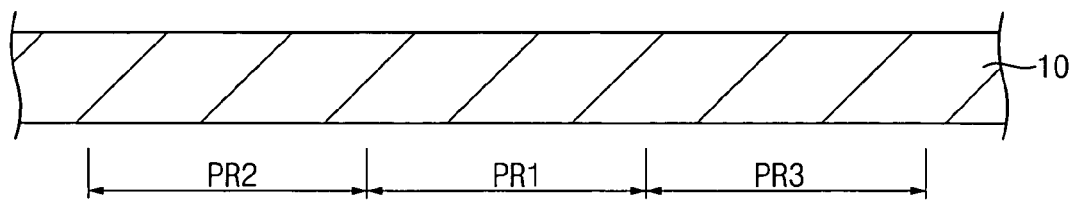
FIG. 11 is a cross-sectional view for showing a method of manufacturing a display device in accordance with an embodiment of the present invention.

FIG. 11 is a cross-sectional view for showing a method of manufacturing a display device in accordance with an embodiment of the present invention.

Referring to FIG. 11, a substrate 10 may include a transparent glass substrate. The substrate 10 includes a first pixel region PR1, a second pixel region PR2 and a third pixel region PR3. Each of the first, second and third pixel regions PR1, PR2 and PR3 has a substantially quadrangular or rectangular shape when viewed on a plane.

Figure 12:
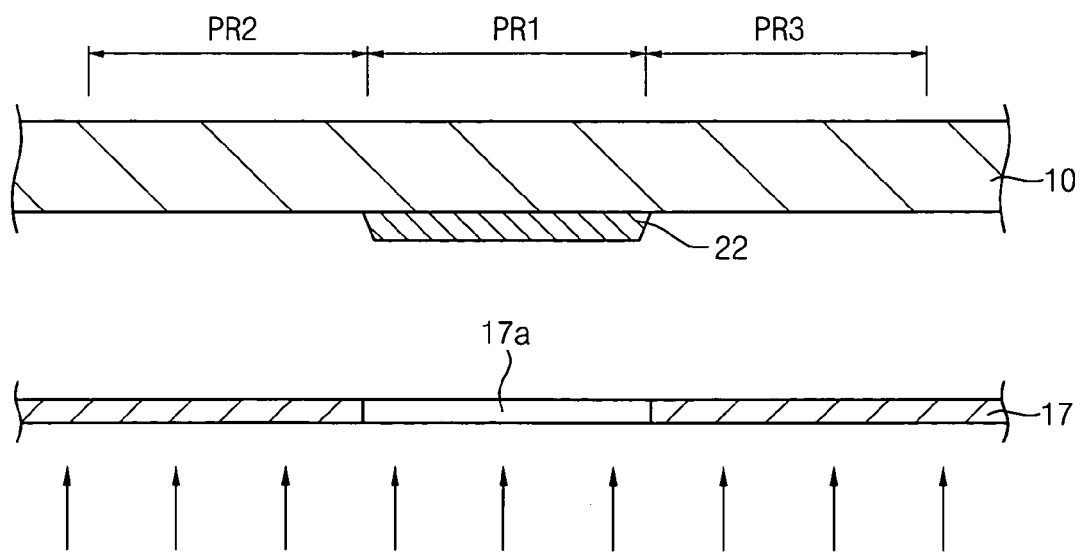
FIG. 12 is a cross-sectional view showing a first color layer formed on the substrate shown in FIG. 11 in accordance with an embodiment of the present invention.

FIG. 12 is a cross-sectional view showing a first color layer formed on the substrate shown in FIG. 11.

Referring to FIG. 12, a shift mask 17 that has an opening 17a corresponding to the first pixel region PR1 is aligned with the substrate 10.

A yellow pigment is deposited on the substrate 10 through the shift mask 17 so that a first color layer 22 is formed in the first pixel region PR1 corresponding to the opening 17a. For example, a thickness of the first color layer 22 may be about 250 nm to about 600 nm.

Figure 13:
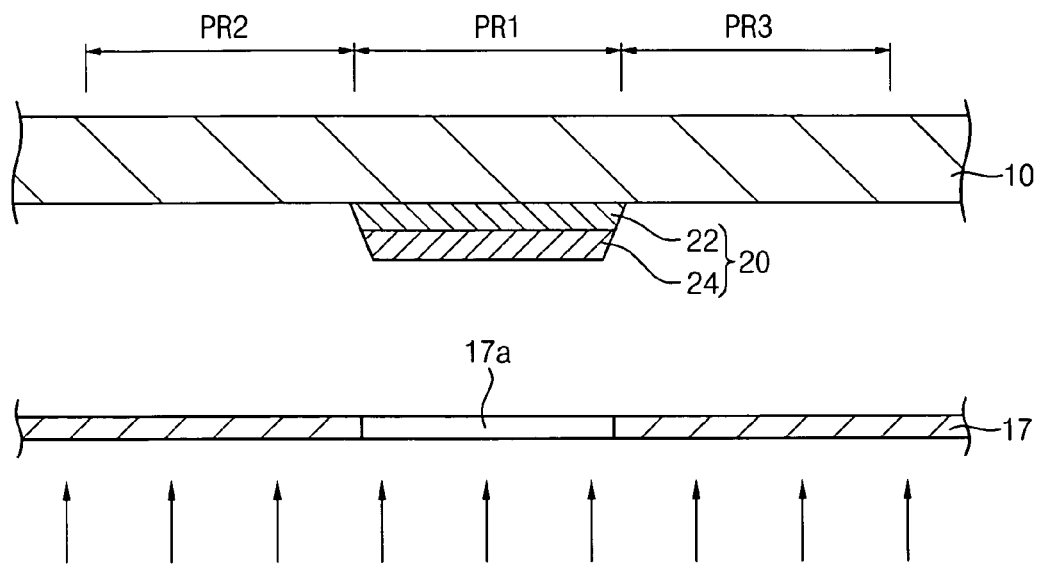
FIG. 13 is a cross-sectional view showing a second color layer formed on the substrate shown in FIG. 12 in accordance with an embodiment of the present invention.

FIG. 13 is a cross-sectional view showing a second color layer formed on the substrate shown in FIG. 12.

Referring to FIG. 13, a blue pigment is deposited on the first color layer 22 through the shift mask 17 so that a second color layer 24 is formed in the first pixel region PR1 corresponding to the opening 17a. Therefore, a first color filter pixel 20 having the first and second color layers 22 and 24 is completed. For example, a thickness of the second color layer 24 may be about 50 nm to about 600 nm.

Figure 14:
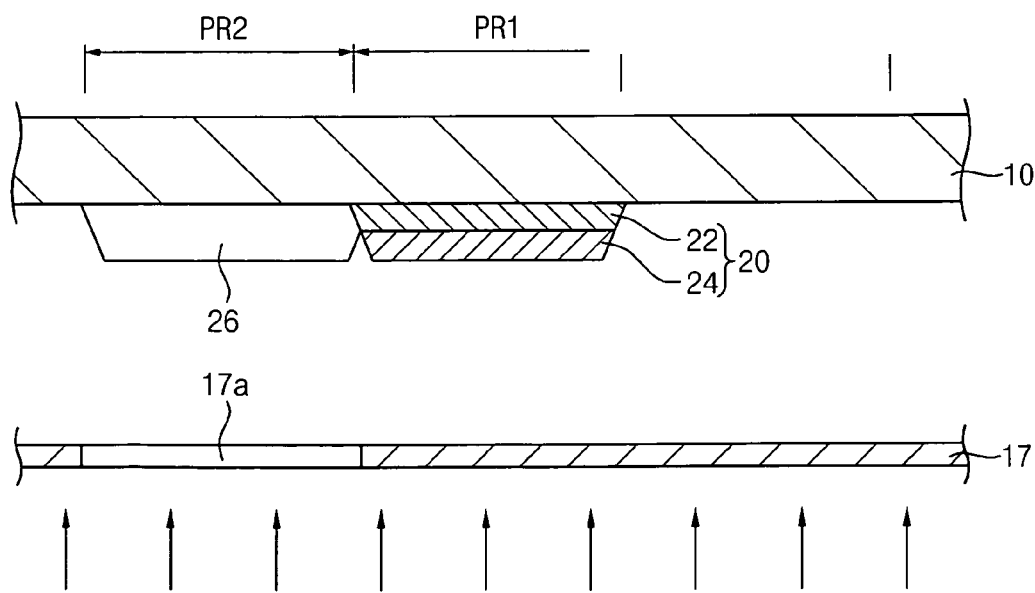
FIG. 14 is a cross-sectional view showing a second color filter pixel formed on the substrate shown in FIG. 13 in accordance with an embodiment of the present invention.

FIG. 14 is a cross-sectional view showing a second color filter pixel formed on the substrate shown in FIG. 13.

Referring to FIG. 14, the shift mask 17 is aligned so that the opening 17a corresponds to the second pixel region PR2. A red pigment is deposited on the substrate 10 through the shift mask 17 so that a second color filter pixel 26 is formed in the second pixel region PR2 corresponding to the opening 17a.

Figure 15:
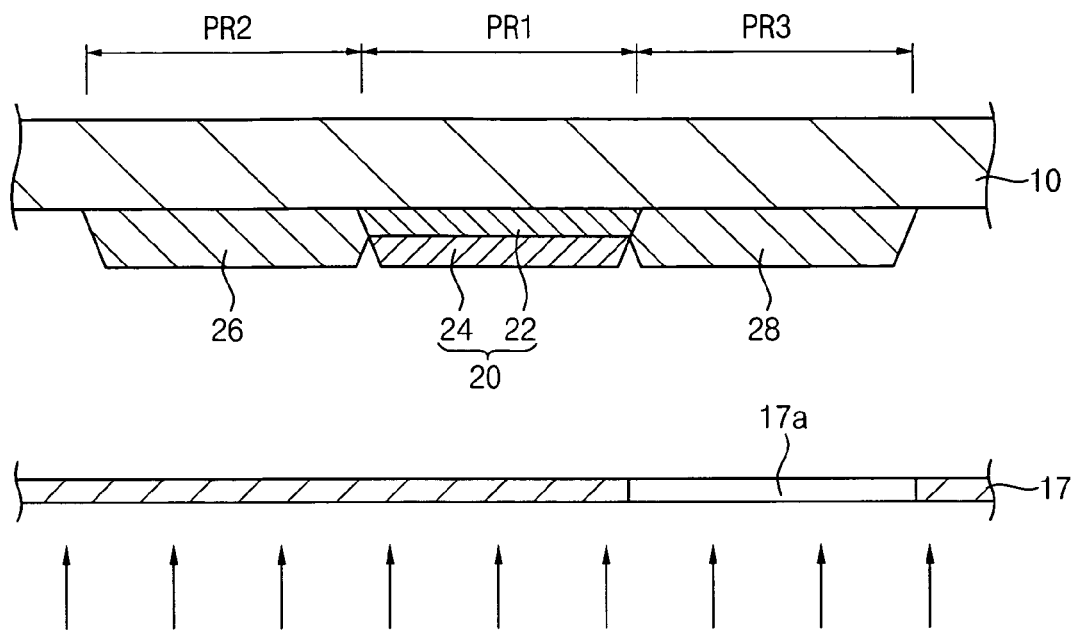
FIG. 15 is a cross-sectional view showing a third color filter pixel formed on the substrate shown in FIG. 14 in accordance with an embodiment of the present invention.

FIG. 15 is a cross-sectional view showing a third color filter pixel formed on the substrate shown in FIG. 14.

Referring to FIG. 15, the shift mask 17 is aligned so that the opening 17a corresponds to the third pixel region PR3. A blue pigment is deposited on the substrate 10 through the shift mask 17 so that a third color filter pixel 28 is formed in the third pixel region PR3 corresponding to the opening 17a.

Figure 16:
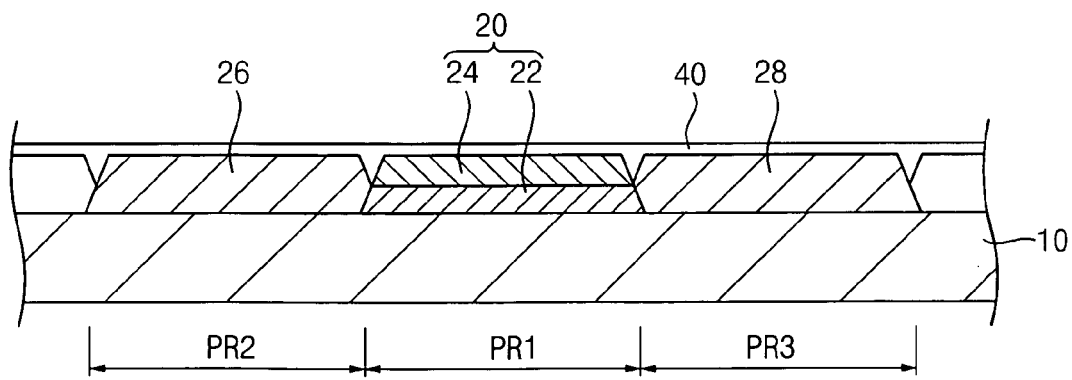
FIG. 16 is a cross-sectional view showing a transparent electrode formed on the substrate shown in FIG. 15 in accordance with an embodiment of the present invention.

FIG. 16 is a cross-sectional view showing a transparent electrode formed on the substrate shown in FIG. 15.

Referring to FIG. 16, a transparent electrode 40 may be formed on an entire surface of the substrate 10 having the first, second and third color filter pixels 20, 26 and 28 through a chemical vapor deposition process or a sputtering process. For example, the transparent electrode 40 includes a transparent conductive material. Examples of the transparent conductive material that can be used for the transparent electrode 40 include indium tin oxide (ITO), indium zinc oxide (IZO), and/or amorphous indium tin oxide.

An alignment layer (not shown) having alignment grooves may be formed on the transparent electrode 40.

Figure 17:
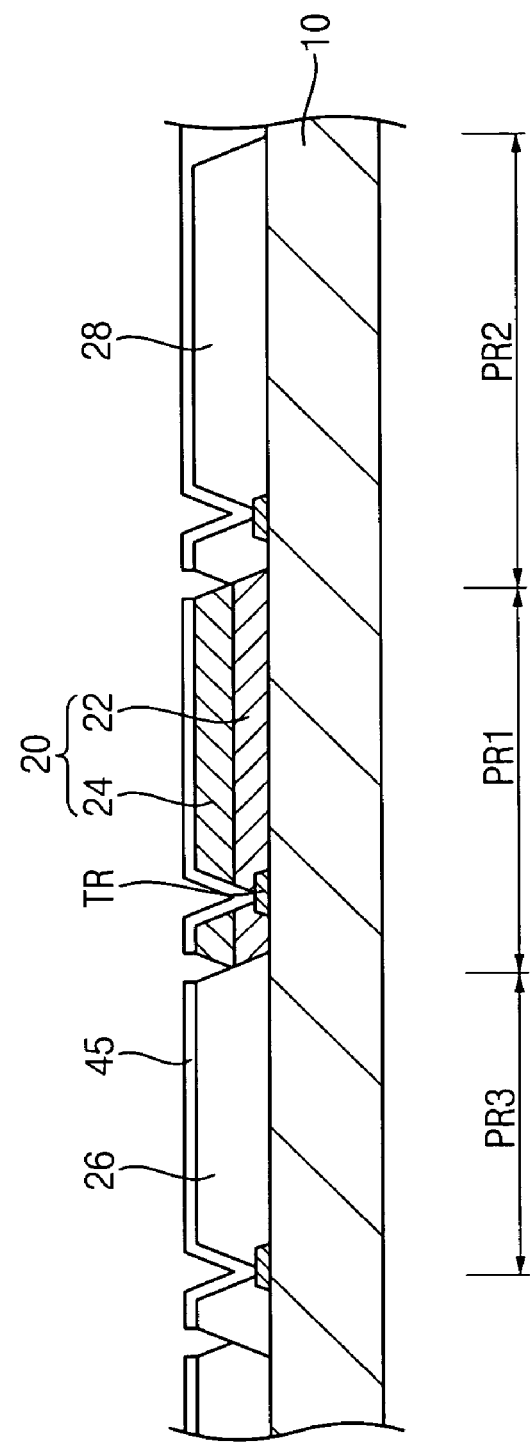
FIG. 17 is a cross-sectional view for showing a method of manufacturing a display device in accordance with an embodiment of the present invention.

FIG. 17 is a cross-sectional view for showing a method of manufacturing a display device in accordance with an embodiment of the present invention. The method of manufacturing the display device of FIG. 17 is substantially the same as that shown in connection with FIGS. 11 to 16 except with respect to, for example, forming a thin film transistor and a transparent electrode.

Referring to FIG. 17, thin film transistors TR are formed on a substrate 10. A first color filter pixel 20, a second color filter pixel 26 and a third color filter pixel 28 are formed in a first pixel region PR1, a second pixel region PR2 and a third pixel region PR3 of the substrate 10, respectively.

The first, second and third color filter pixels 20, 26 and 28 are patterned through a photolithography process to form contact holes through which drain electrodes of the thin film transistors TR are partially exposed, respectively.

A transparent conductive thin film is deposited on an entire surface of the first, second and third color filter pixels 20, 26 and 28 of the substrate 10 through, for example, a chemical vapor deposition process, or a sputtering process. Examples of the transparent conductive material that can be used for the transparent conductive thin film include indium tin oxide (ITO), indium zinc oxide (IZO), and/or amorphous indium tin oxide.

The transparent conductive thin film is patterned through a photolithography process to form transparent electrodes 45 on the first, second and third color filter pixels 20, 26 and 28, respectively. Each of the transparent electrodes 45 is electrically connected to the drain electrode of each of the thin film transistors TR.

An alignment layer (not shown) having alignment grooves is formed on the substrate 10 having the transparent electrode 45.

In FIG. 17, the first and second color layers 22 and 24 that are in the first pixel region PR1 include a yellow pigment and a blue pigment, respectively. Alternatively, the yellow and blue pigments may be uniformly mixed in the first color filter pixel 20.

According to the embodiments of the present invention, one of the pigments, such as the green pigment, is omitted to decrease a time period for manufacturing the display device. In addition, an image display quality of the display device having the color filter pixel is improved.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display device comprising:
a substrate including a first pixel region and a second pixel region adjacent to the first pixel region for displaying an image;
a first color filter pixel formed in the first pixel region to change a white light into a colored light, the first color filter pixel including:
a first color layer generating a first color light; and
a second color layer formed directly on the first color layer and generating a second color light different from the first color light; and
a second color filter pixel formed in the second pixel region, wherein the second color filter pixel comprises not more than one color layer.

2. The display device of claim 1, wherein the colored light is a green light.

3. The display device of claim 2, wherein the first and second color layers comprise a blue pigment for generating a blue light and a yellow pigment for generating a yellow light, respectively.

4. The display device of claim 3, wherein a thickness of the second color layer is about one to about five times a thickness of the first color layer.

5. The display device of claim 4, wherein the thickness of the second color layer is about 50 nm to about 600 nm.

6. The display device of claim 2, wherein the first and second color layers comprise a yellow pigment for generating a yellow light and a blue pigment for generating a blue light, respectively.

7. The display device of claim 6, wherein a thickness of the first color layer is about one to about five times a thickness of the second color layer.

8. The display device of claim 1, wherein the second color filter pixel comprises a red pigment for generating a red light.

9. The display device of claim 1, further comprising a third color filter pixel in a third pixel region adjacent to the first pixel region, the third color filter pixel including a blue pigment for generating a blue light.

10. The display device of claim 1, further comprising a transparent electrode on the first and second color filter pixels.

11. The display device of claim 10, further comprising an alignment layer on the transparent electrode.

12. The display device of claim 10, further comprising a thin film transistor electrically connected to the transparent electrode.

13. The display device of claim 12, further comprising an alignment layer on the transparent electrode, the alignment layer having alignment grooves.

14. A display device comprising:
a substrate including a first pixel region, a second pixel region and a third pixel region for displaying an image;
a first color filter pixel in the first pixel region, the first color filter pixel including a blue pigment for generating a blue light and a yellow pigment for generating a yellow light so that a combination of the blue and yellow lights generates a green light, wherein the blue and yellow pigments are distributed in the same layer, the blue and yellow pigments both being positioned throughout the entire layer including top and bottom sides;
a second color filter pixel in the second pixel region, the second color filter pixel including a red pigment for generating a red light; and
a third color filter pixel in the third pixel region, the third color filter pixel including a blue pigment for generating a blue light.

15. The display device of claim 14, wherein a volumetric ratio of the blue to yellow pigments in the first color filter pixel is about 1:1 to about 1:5.

16. A method of manufacturing a display device comprising:
defining a first pixel region, a second pixel region and a third pixel region on a substrate for displaying an image;
forming a first color filter pixel in the first pixel region that includes a first color layer having a first pigment and a second color layer having a second pigment, the second color layer being positioned on the first color layer, wherein the first pigment is deposited on the substrate through a shift mask to form the first color layer, and the second pigment is deposited on the first color layer through the shift mask to form the second color layer;
forming a second color filter pixel in the second pixel region, the second color filter pixel including a third pigment, wherein the second color filter pixel includes not more than one color layer; and
forming a third color filter pixel in the third pixel region, the third color filter pixel including the first or the second pigment.

17. The method of claim 16, wherein the first pigment is a yellow pigment for generating a yellow light, and the second pigment is a blue pigment for generating a blue light.

18. The method of claim 16, wherein the first pigment is a blue pigment for generating a blue light, and the second pigment is a yellow pigment for generating a yellow light.

19. The method of claim 16, wherein the first color layer is formed by depositing the first pigment on the substrate in the first pixel region.

20. The method of claim 16, wherein a ratio of a thickness of the first color layer to a thickness of the second color layer is about 1:1 to about 1:5.

21. The method of claim 16, further comprising forming a transparent electrode on the first, second and third color filter pixels.

22. The method of claim 21, wherein a first transparent electrode, a second transparent electrode and a third transparent electrode are on the first, second and third color filter pixels, respectively.

23. The method of claim 22, further comprising a plurality of thin film transistors in the first, second and third pixel regions, respectively, the thin film transistors being electrically connected to the first, second and third transparent electrodes, respectively.

* * * * *